United States Patent [19]

Hammond

[11] Patent Number: 5,155,761

[45] Date of Patent: Oct. 13, 1992

[54] AUTOMATIC CALL BACK SYSTEM AND METHOD OF OPERATION

[75] Inventor: Daniel D. Hammond, Dallas, Tex.

[73] Assignee: InterVoice, Inc., Dallas, Tex.

[21] Appl. No.: 470,948

[22] Filed: Jan. 26, 1990

[51] Int. Cl.[5] .................. H04M 1/64; H04M 1/57; H04Q 3/64

[52] U.S. Cl. ................... 379/67; 379/157; 379/84; 379/142; 379/214; 379/266

[58] Field of Search ............ 379/201, 209, 214, 157, 379/142, 67, 88, 89

[56] References Cited

U.S. PATENT DOCUMENTS

| | | | |
|---|---|---|---|
| 4,166,929 | 9/1979 | Sheinbein | 379/209 X |
| 4,567,323 | 1/1986 | Lottes et al. | 379/201 |
| 4,800,583 | 1/1989 | Theis | 379/67 |
| 4,969,185 | 11/1990 | Dorst et al. | 379/201 X |

Primary Examiner—James L. Dwyer
Assistant Examiner—Harry S. Hong
Attorney, Agent, or Firm—Winstead Sechrest & Minick

[57] ABSTRACT

A system and method of answering incoming calls are disclosed in which, if the resource (18)(19) desired by the caller is not then available, a robot controller (14) will inform the caller when a call back to the caller can be made. The callback time can be suggested by the robot controller (14) or the caller can request a specific callback time. The robot controller (14) ascertains and verifies the caller's call back identity and stores the number of the identity in a callback queue (11) along with such other pertinent information as the callback time, the caller's name and the required resource. At the appropriate time, the robot controller (14) removes the information from the callback queue (11), places the call and connects the desired resource (18)(19).

66 Claims, 3 Drawing Sheets

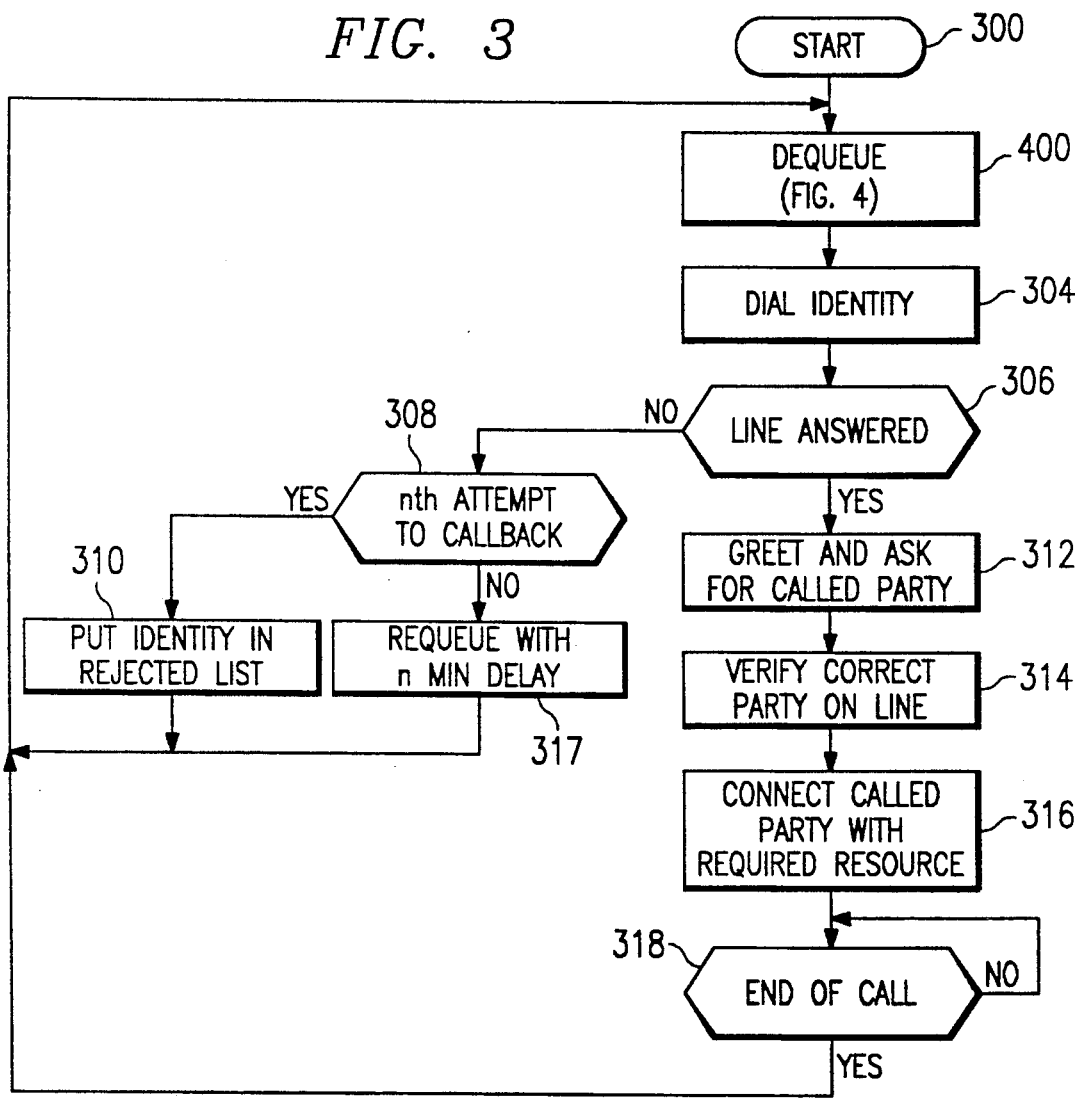

AUTOMATIC CALL BACK SYSTEM AND METHOD OF OPERATION

TECHNICAL FIELD OF THE INVENTION

This invention relates to a system and method of answering incoming communication calls and more particularly to such a system and method for establishing an automatic callback for certain of the incoming calls.

BACKGROUND OF THE INVENTION

A common telephone experience is dialing a number, only to be told to wait while the operators are handling other calls. This message is usually a prerecorded announcement informing the hapless caller that "all operators are busy. Please remain on the line and your call will be answered by the first available attendant."

Wait or call back? A dilemma without answer. How long will the wait be? How important is the information (or the order for goods or services) to the caller? To add injury to the situation, often the called party takes this opportunity to play commercials to the captive listener! To add further insult, often the call is long distance and the caller is paying for the commercial!

From the called party's point of view there is lost business because some percentage of callers hang up and do not call back. In many situations, the incoming call is being paid for by the called party and this "holding" time is costly to the called party especially when many calls are placed on hold routinely. In either event, a great deal of inconvenience and frustration is involved for those who do call back, especially because there is no guarantee that the second call can be completed either. This, then, is a no-win situation.

Thus, a need exists in the art for a system which eliminates the need for callers to decide whether to hold or hang up and which converts a no-win situation into one in which both parties can be satisfied.

A further need exists in the art for such a solution which does not cost either party time or effort or significant installation costs. It must also maximize the effective use of time by both the calling and the called parties, while reducing the communication cost to at least one of the parties.

In some situations, for example immediately after a commercial has been aired on TV, a business is inundated with a very large volume of incoming calls. In this situation, all of the available operators, or other communication resources, become swamped. Usually, the incoming trunks to the business cannot handle the temporary calling volume and many callers get busy tone. This, again, is frustrating to the caller and is potential lost business to the called party.

Thus, a need exists in the art for a system which reduces to a minimum the trunk holding time during high volume periods, while still processing the calls in an orderly and efficient manner.

In still another context, many communications today are effected between computers, or between other electronic equipment, such as facsimile machines. These communications do not always require human intervention and thus often can be accomplished at off-hour times to take advantage of reduced traffic and reduced costs. This situation can also occur across wide time zones where data transfer which is convenient for one party is not convenient for the other.

Thus, a need also exists in the art for a system which allows a calling party, or a called party, to schedule the communication to take place at some time in the future which is mutually agreed upon. Such a system must be capable of operating without human intervention.

In a still further context, many callers call into a facility, get put on hold, and then after some period of time (for which someone is paying) reach an attendant (or other resource, only to find out that the transaction they desired, or the information they wanted was not available at the called facility. The calling party is then told to call some other number and the process of waiting on hold begins again.

Thus a need exists in the art for a system which allows a called facility to identify callers, establish a time of call back and then handle that call in an efficient manner for all parties, all without requiring the calling party to requeue at another called facility.

SUMMARY OF THE INVENTION

These objectives, as well as others, have been achieved by a system and method of operation which provides an electronic operator to process calls which cannot (or should not) be serviced immediately by either a live attendant or by other call servicing resources, such as computers, data bases, modems, facsimile machines, etc. In addition, the necessary resource need not be the call completion resource, but could be an intermediate call progress resource, such as a voice recognition module, a rotary dial translator or a DTMF decoder. The robot operator determines the call back identity of the caller and also establishes a time, or a range of time, when a resource will be available. This time for the callback is communicated to the caller so that the caller can go about his/her business and not be tied to the telephone listening to unwanted music or messages and paying for the same.

The robot can automatically ascertain the call back number, or can ascertain by interrogation of the caller the number at which the calling party desires to be called back.

A still further enhancement allows the robot to ascertain exactly the time the caller wishes to be called back in the event the time assigned by the robot is inconvenient. This then allows both the caller and the called party to schedule the time for the call back. The call back time can be set to be a few minutes, an hour, or even days later. The call back number can be the caller's current number or a different number, depending upon the calling party's schedule.

Both parties benefit under this scenario: the caller because he/she need not remain on the line waiting and can even go to another location and be available at a particular time; the called party because when the call is returned, it will be greeted by a receptive customer. The called party benefits because it can schedule its work force to accommodate the preplanned call back.

Further refinements allow the called party to ascertain the type of information the customer wishes and thus further tailor the call back response.

The called party can determine the call back number from some systems using automatic number identification (ANI) or the calling number can be identified by recording the digits entered by the calling party in response to prompts by the answering robot. Prompts can also be used to solicit other information from the caller which will be useful in returning the call.

The call back time can be predicted automatically on a statistical basis if the calling party does not establish a particular time for the call back. In addition, the answering robot, based on statistics or on other information, can tell the caller that the call back will be at a precise time or within a range of times. The system then sets the call back for the established time or on an availability basis within the established defined call back time limits.

For anticipated high volume call-in times, trunk time can be minimized by having the robot answer all calls with a greeting such as, "Hello, many calls are coming in to us now. We have identified your call back number as XXX XXXXXXX, we will call you at that number in YY minutes. If the call back identity is correct and if the time is acceptable please press the number 1 on your dial and then hang up the telephone. Please press 2 if a different call back number should be used or press number 3 if a different time is desired."

Assume a situation in which a calling facility, for example a bank computer, wishes to transfer data with a called facility, such as another bank's computer, and also assume for a moment that the called bank's computer is busy, or worse, experiencing down time. Also, let us assume that this transaction can occur any time before the opening of business the next day. Under this scenario then, the calling computer places the calling connection to the called bank. A robot operator answers on a temporary basis and first ascertains the call back identity of the calling computer. The robot then informs the calling computer the time of the call back. This can be predictively determined or can be preset, such as in the case of maintenance downtime. Alternatively, the calling computer can be instructed to call back at the given time.

In situations where a call cannot be handled by the resources available at the called facility, the call back identity can be obtained, with or without a specified call back time, and the information forwarded to another remote facility. In this manner the calling party will be called back, perhaps at a given time, by resources located at the remote facility.

Thus, it is a further technical advantage of this invention that the robot operator can identify call back identities and call back times as well as other pertinent information from a caller and then forward the information to a remote facility for further processing by that other facility. In this manner, all parties save time and effort and the customer is served in an efficient manner.

It is a technical advantage of this invention to minimize the trunk holding time for peak incoming calls by robotically ascertaining a call back number and call back time for incoming calling connections. When the desired resource is available, a call back will be made to the identified calling party.

It is a still further advantage of this invention to provide such a system in which the parties can schedule a call back time by the exchange of information. The information from the called party, as well as from certain calling parties, can be robotically generated by predictive or other arrangements.

Accordingly, it is a technical advantage of the invention that a called party determine from a calling party, either automatically or manually, a call back number and then place a call back to the calling party at a predetermined time.

It is a further technical advantage of the present invention that the system operates without any modification to the calling party's telephone and without cost (other than normal toll charges) to the calling party.

It is a technical advantage of this invention to minimize the trunk holding time for peak incoming calls by robotically ascertaining a call back number and call back time for incoming calling connections. When the desired resource is available, a call back will be made to the identified calling party.

It is a still further advantage of this invention to provide such a system in which the parties can schedule a call back time by the exchange of information. The information from the called party, as well as from certain calling parties, can be robotically generated by predictive or other arrangements.

It is a still further advantage of this invention to provide an automatic caller identity and to forward that identity to another facility for call back by that other facility.

BRIEF DESCRIPTION OF THE DRAWINGS

The foregoing objects, features and technical advantages, as well as others, of the invention will be more apparent from the following description of the drawing in which:

FIG. 3 illustrates a logic flow chart of the call back procedure of the present invention.

DETAILED DESCRIPTION OF THE INVENTION

The preferred embodiment of the present invention is best understood by referring to FIGS. 1-5 of the drawings, like numerals being used for like and corresponding parts of the various drawings.

Figure 1:
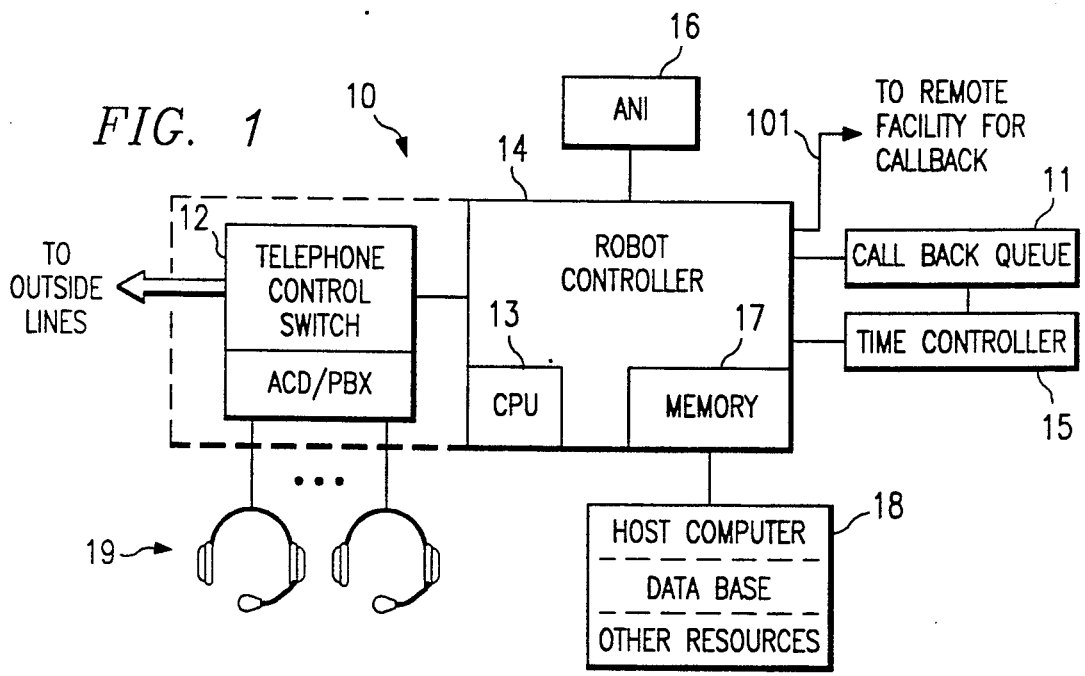
FIG. 1 illustrates a block diagram of the present invention.

FIG. 1 illustrates a block diagram of the present invention, generally indicated as 10. Outside telephone lines are coupled through a telephone control switch 12 to a robot controller 14, which is controlled, in part, by CPU 13 and memory 17. Robot controller 14 can be a standalone system or can be part of telephone control switch 12. Switch 12 can include an ACD/PBX with attendants 19, if desired. Other call completion resources can be connected to the outside lines. These, for example, are shown in box 18 to be a host computer, a data base, or other resources, such as FAX machines, modems, etc. Any number and type of resources can be served by this system.

Circuitry for automatic number identification (ANI) 16 is coupled to, or combined within, robot controller 14. The ANI function could be performed, for example, from information sent over the incoming lines or trunks from the calling station, or from central office generated information, or from ISDN information.

In operation, incoming telephone calls from outside telephone lines are allocated by ACD/PBX 18 or by the telephone switch to available resources such as attendants 19 or to computer 18. In the event that the resources are unavailable, robot controller 14 directs ANI 16 to determine, if possible, the telephone number of the incoming call. Robot controller 14 then advises the caller that all required resources are busy. After making some predictive calculations, robot controller 14 advises the caller as to the time (or range of times) when he or she can expect the call to be returned. The caller could also be requested to input (DTMF, rotary, or voice) a call back time and a call back number. The robot controller then either ends the calling connection or queries the caller to determine if the caller wishes to hold or be called back. If the caller wishes to be called back, robot controller 14 attains the caller's name, verifies (or obtains, if ANI or other automatic systems are not available) his or her telephone number, or call back identity.

If a callback is acceptable to the caller, robot controller 14 terminates the call and places the information obtained from the caller into callback queue 11. At the established time, assuming that the proper resource is available, robot controller 14, in conjunction with information from queue 11 and time controller 15, reestablishes the call, verifies that the answering party is the person to be called, and then transfers the call through ACD/PBX 18 or other internal switching to the available resource.

Systems, such as ACD/PBX 18 which answer incoming telephone calls and allocate the calls to available attendants, are well known in the art and will not be detailed here. Such a system is disclosed in U.S. Pat. No. 3,571,518 issued to Chipman et al., which is incorporated herein by reference.

As discussed above, the time of call back can be predictively generated based on the known or calculated time of availability, such as a scheduled return from a maintenance down time of certain resources, or such as the arrival time of human attendants, or such as the anticipated end of a peak call-in period. The call back time could also be established statistically. Once this determination is made, the system can be arranged to communicate this expected call back time to the calling party and then hang-up. Alternatively, the call back time can be communicated and then the calling party queried as to whether or not this is acceptable. The robot operator can use a human understandable voice, or if desired, digital information could be provided to the calling line to handle situations where the caller is a machine, such as a computer. Responses from the calling line can require many different resources within the robot operator to process the information, which can be a human voice, typed key pad responses to queries, or other types of information coming from the calling line or outside the calling line, for example, by integrated services digital network (ISDN) signals. One such arrangement for handling such resources is shown in copending patent application of Apparatus and Method for Automatically Reconfiguring Telephone Network Resources, filed concurrently herewith assigned to a common assignee, and which is hereby incorporated by reference herein.

Digressing momentarily, it should be understood that the ascertainment of the calling party identity and the ascertainment of the call back time is made without human intervention at the called facility on a call by call basis. Many different types of resources can be used to complete calling connections and the lines can be digital or analog or a combination of both.

Figure 2:
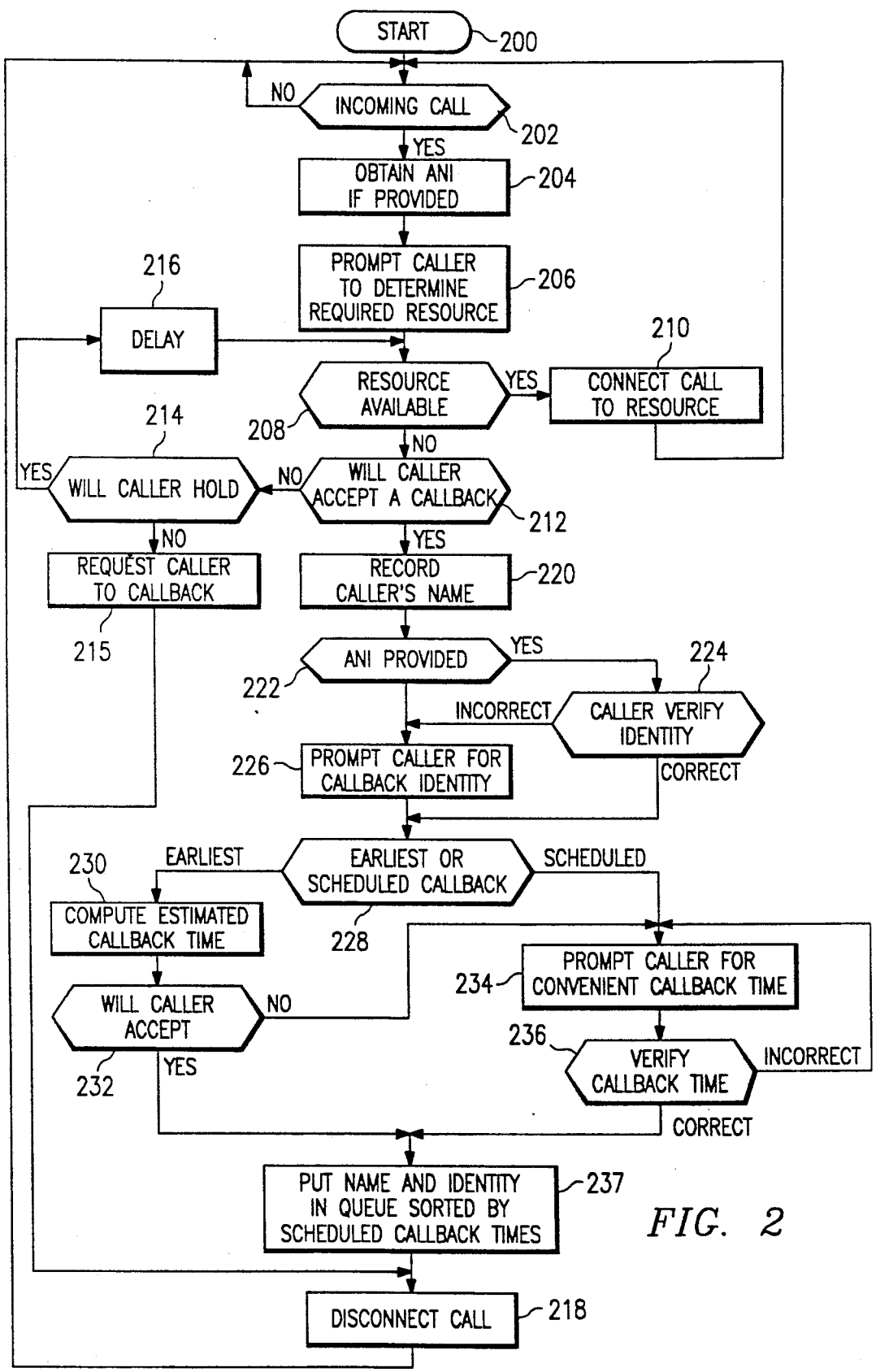
FIG. 2 illustrates a logic flow chart of the call-reception procedure of the present invention.

FIG. 2 illustrates a logic flow chart of the operation of robot controller 14 as it manages incoming calls from outside telephone lines. After initializing 200 the system, robot controller 14 waits for an incoming call 202. Once a call is received, the system obtains an automatic number identification 204 from the incoming call, if possible. Connection is then made and controller 14 prompts the caller for the required resource 206. If the resource is available 208, controller 14 connects the call 210 with the resource and continues waiting for incoming calls 202.

If the required resource is not available, controller 14 asks the caller whether the caller will accept a callback 212 at a later time. If the caller will not accept a callback, the caller is asked whether he/she wishes to hold 214; if so, a delay period 216 is initiated after the expiration of which controller 14 determines whether the required resource is then available 208. If the caller will not accept a callback 212 and is not willing to hold 214, controller 14 requests the caller to call back at a later time 216. The callback time can be suggested by controller 14. The call is then disconnected 218 and controller 14 waits for further incoming calls 202.

If the caller is willing to accept a callback 212, controller 14 records the caller's name 220 and, if ANI was provided 222, has the caller verify the number provided 224. If ANI was not provided 222 or if the ANI number provided was incorrect 224, robot controller 14 prompts the caller for the proper callback number 226. Once the correct callback number has been verified 226 and 224, robot controller 14 asks the caller whether he/she desires a callback at the earliest possible time or at a predetermined scheduled time 228. If the caller responds that he/she wishes to be called back at the earliest possible time, controller 14 computes the estimated callback time 230, notifies the caller and asks whether the estimated callback time is acceptable 232. If the estimated callback time is not acceptable or if the caller wanted to schedule a callback time 228, controller 14 prompts the caller for the desired callback time 234 and then asks for verification 236. If the callback time is incorrect 236, controller 14 will again prompt the caller for a convenient callback 234.

Once the callback time is verified 236 and 232, controller 14 places the caller's name and callback number in the callback queue 300, disconnects the call 218 and waits for new incoming calls 202.

Again digressing momentarily, various blocks of the flow chart of FIG. 2 could be bypassed to modify the service. For example, box 208 can be made temporarily (or permanently) busy for peak-period call in, so as to minimize trunk holding time. Likewise, box 212 could be bypassed, either temporarily or permanently, depending upon the application or depending again upon trunk hold time calculations. Other boxes, such as box 228 and box 234, could be temporarily or permanently bypassed to change the service for a particular facility or for a period of time. In addition, various functions can be added to allow the system to obtain other information from the calling line, such as, for example, the name and address of the calling party or the nature of the call. This information would be stored in conjunction with the call back time so as to assist in the type of call back that will be established. Different resources could be assigned to the call back dependent on this obtained information, or the caller could be directed to call other facilities to obtain the desired information. Of course, the call back need not even come from the called facility but may, in fact be provided from a totally independant facility. In this regard, the queued information would be communicated to the remote facility via path 101 (FIG. 1). This communication can be by wire or by transmission in any manner and can occur immediately upon generation at the called facility or may occur at a later time and processed as a batch file.

FIG. 3 illustrates a logic flow chart of the call back procedure of controller 14. After entering the procedure 300, controller 14 proceeds to the dequeue procedure 400 and obtains a call back number and name message from the appropriate queue. The number is dialed 304 and controller 14 waits for the line to be answered 306. If, after a prescribed number of rings, the line is not answered, controller 14 terminates the call attempt and determines whether the call was the third attempted call back to that number 308. If so, the number is placed in a rejected list 310 and controller 14 returns to determine whether a resource is available 302 for other callbacks. If the call just attempted was not the nth attempted callback to the number, the number and name message are requeued 317 with a n minutes delay and controller 14 returns to start 300 other callbacks.

If the line is answered 406, a greeting message is played and the called party requested. Controller 14 then verifies that the correct party is on the line 314 and connects the called party with the required resource 316. Controller 14 then waits until the end of the telephone call 318 before returning to determine whether a resource is available 302 for other callbacks. Of course, when the facility has multiple resources, many such routines are in progress under control of robot controller 14.

Figure 4:
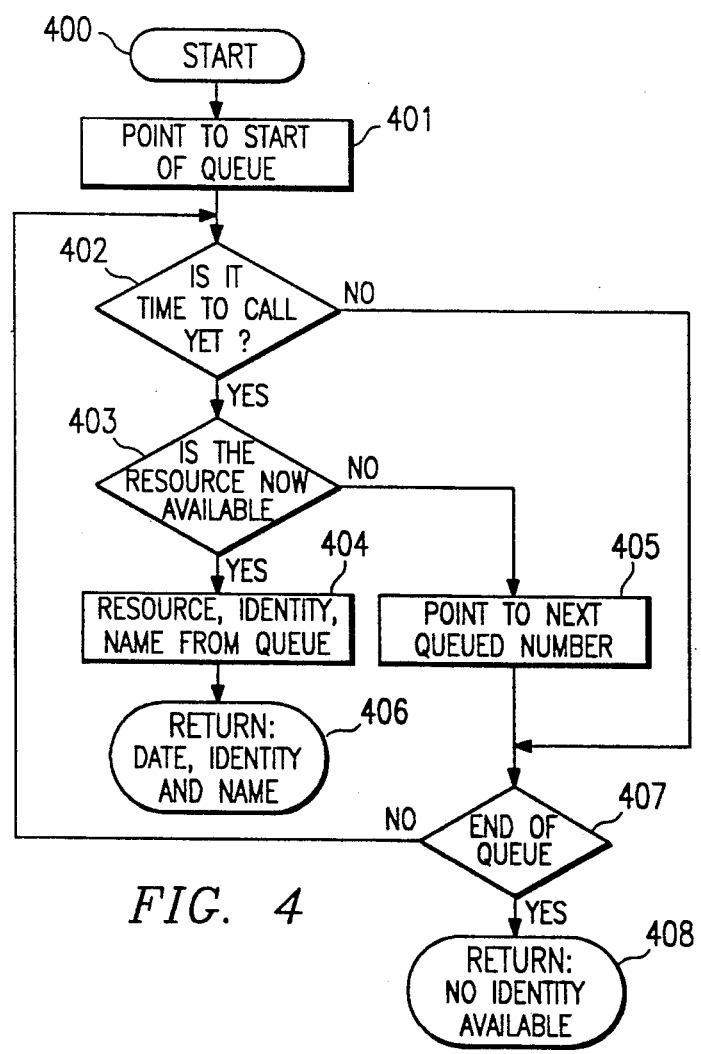
FIG. 4 illustrates a logic flow chart of the dequeue subroutine of the present invention.

FIG. 4 shows the dequeue logic for removing information from the queue and establishing calls at the proper time. Pointer 401 points to the start of the queue. Box 402 checks to determine if the next record is due to be removed based on call back time. If yes, then a check is made to see if the desired resource is available. If there is no such resource or no such number, then we end this routine by box 408. However, if the resource is available, then the resource in box 404, including the number, name and any other information obtained when the call first arrived is processed in a straightforward manner under control of box 406 working in conjunction with robot controller 14 and with telephone control switch 12.

The dequeue procedure of FIG. 4 could also be used to send information at the appropriate time to a remote facility or the system could be arranged to gather information and transmit as gathered or in batches.

Consequently, the system of the present invention has the technical advantage of providing automatic callback to callers at the earliest or scheduled times, at the caller's option. As a result, callers are not forced to make a choice between waiting on hold for an indefinite period of time or calling back later. Rather, callers are extended the courtesy of having the call returned automatically at an established time.

Although the present invention has been described in detail in conjunction with a ACD/PBX, it should be understood that various changes, substitutions and alterations can be made herein without departing from the spirit and scope of the invention as defined by the appended claims. The ACD/PBX need not be provided and the network can complete calls to resources in any manner. In some situations call completion resources need not be available at the called facility. In such a situation, all of the call back activity would be preformed from a remote facility.

What is claimed is:

1. A system for answering incoming calls on a plurality of telephone lines, said system comprising
   means for robotically ascertaining a digitally encoded call back identity of incoming calls;
   means for disconnecting said incoming calls after said call back identity has been ascertained; and
   means operating from said digitally encoded call back identify for establishing a call back connection to said ascertained identities of said incoming calls at a later period of time.

2. The system set forth in claim 1 wherein said answering system includes a plurality of resources, any one of which can service said incoming calling connections; and
   wherein said robitcally ascertaining means is responsive to an unavailability of said resources to service said incoming calls.

3. The system set forth in claim 1 further including
   means for robotically ascertaining a digitally encoded call back time for each said ascertained call back identity; and
   means for robotically communicating said ascertained call back time to each said incoming call prior to enabling said disconnecting means with respect to said incoming calls.

4. The system set forth in claim 3 wherein said answering system includes a plurality of resources, any one of which can service can incoming calling connections; and
   wherein said call back time ascertaining means includes means for predictively determining the prospective availability of said resources.

5. The system set forth in claim 3 further including a queue of ascertained call back identities, and means for removing said call back identities from said queue at said ascertained call back time.

6. The system set forth in claim 3 wherein said callback time ascertaining means further includes
   means for determining the statistical probability that a resource wall be available when said call is completed to said ascertained call back identity.

7. The system set forth in claim 1 further including call back time ascertaining means for exchanging information over said telephone line, said information being in human understandable form from said system and in digitally encoded form to said system.

8. The system set forth in claim 1 wherein said call back identity ascertaining means includes
   means for receiving ANI information from said incoming calls.

9. A robot controller responsive to incoming calls from a plurality of calling telephone facilities comprising:
   a central processing unit for controlling said robot controller;
   means controlled by said processing unit for ascertaining a digitally encoded call back time for selected calling telephone facilities; and
   means operating from said digitally encoded call back time for establishing a call back connection to certain ones of said selected calling telephone facilities at a later period of time.

10. The robot controller of claim 9 wherein said call back establishing means includes:
    a callback queue for storing callback information for said certain ones of said calling telephone facilities; and
    means for removing from said queue stored call back information at said later period of time.

11. The robot controller of claim 9 wherein said call back time ascertaining means includes:

means for interrogating said selected calling telephone facilities; and means for monitoring signals returned from said calling telephone facilities in response to said interrogation.

12. The robot controller of claim 9 wherein said incoming calls require service of call servicing resources; and wherein said call back time is ascertained when said call servicing communication resources are unavailable to handle said telephone facility; and wherein said call back time ascertaining means includes:

means for interrogating said selected calling telephone facility to establish a call back time;

means for predictively determining the availability of one of said call servicing communication resources; and means controlled jointly by said interrogating means and by said predictively determining means for controlling said time ascertaining means.

13. The robot controller of claim 9 wherein said means for establishing a call back connection further comprises:

means for establishing said call back to said selected calling telephone facility upon the statistical probability that a resource will be available to handle said established call when said call is completed to said original calling facility.

14. A system for scheduling the subsequent transfer of information from calls incoming to a communication facility from calling communication facilities, said system comprising:

means for temporarily establishing communication connection to any said calling communication facility;

means for robotically establishing the call back identity of said calling communication facility;

means for robotically establishing a call back time with respect to said identified calling communication facility;

means for storing said established call back identity and said established call back time; and means for disconnecting said temporary communication connection and wherein said call back time establishing means includes:

means for interchanging data over said temporarily established communication connection to arrive at a mutually acceptable call back time.

15. The system set forth in claim 14 further comprising:

means for communicating said established call back time over said established communication connection prior to disconnecting said communication connection.

16. The system set forth in claim 14 wherein said call back identity means includes:

means for accepting signals communicated to said called communication facility over said temporarily established communication connection.

17. The system set forth in claim 14 wherein said call back identity means includes:

means for accepting signals communicated to said called communication facility separate from said temporarily established communication connection.

18. The system set forth in claim 14 wherein said robotically establishing means includes:

means for sending requests over said temporarily established communication connection, and wherein said call back identity means includes:

means for accepting signals communicated to said called communication facility over said temporarily established communication connection in response to requests from said robotic establishing means.

19. The system set forth in claim 18 wherein said robotic request sending means includes:

means for converting back and forth between digital data and human understandable form.

20. The system set forth in claim 14 wherein said called communication facility has one or more call servicing resources periodically available for connection to a communication line, and wherein said data interchanging means includes:

means for predictively determining the availability of a given resource at said called communication facility.

21. The system set forth in claim 14 wherein said call back time is established by signals transmitted between said facilities.

22. The system set forth in claim 14 wherein said call back time is generated internal to said system and communicated by said robotic establishing means over said temporarily established communication connection.

23. The system set forth in claim 22 wherein said robotic establishing means includes:

means for converting back and forth between digital data and human understandable form.

24. The system set forth in claim 14 wherein said storing means includes a queue arranged to store call back identities in association with call back times.

25. The system set forth in claim 24 wherein said storing means further includes:

means for removing said call back identities at said associated call back time.

26. The system set forth in claim 24 wherein said call back identification means further includes:

means for also obtaining over said temporarily established connection other information pertinent to said temporary connection; and means for also storing said other information in said queue in association with said call back time.

27. The method of scheduling and subsequent transfer of information from calls incoming to a called communication facility from calling communication facilities, said method comprising the steps of:

temporarily establishing a communication connection to any said calling communication facility;

robotically establishing a call back time with respect to said identified calling communication line;

string said established call back identity and said established call back time; and disconnecting said temporary communication connection and wherein said call back time establishing step includes the step of:

interchanging data over said temporarily established communication connection to arrive at a mutually acceptable call back time.

28. The method set forth in claim 27 further comprising the step of:

communication said established call back time over said established communication connection prior to disconnecting said communication connection.

29. The method set forth in claim 27 wherein said call back identity step includes the step of:

accepting signals communicated to said called communication facility over said temporarily established communication connection.

30. The method set forth in claim 27 wherein said call back identity step includes the step of:
accepting signals communicated to said called communication facility separated from said temporarily established communication connection.

31. The method set forth in claim 27 wherein said robotically establishing step includes the step of:
sending requests over said temporarily established communication connection, and wherein said call back identity step includes the step of:
accepting signals communicated to said communication facility over said temporarily established communication connection in response to requests from said robotic establishing means.

32. The method set forth in claim 31 wherein said robotic request sending step includes the step of:
converting back and forth between digital data and human understandable form.

33. The method set forth in claim 27 wherein said called communication facility has one or more call completion resources periodically available for connection to a calling communication facility, and wherein said data interchanging step includes the step of:
predictively determining the availability of a given resource at said called communication facility.

34. The method set forth in claim 27 wherein said call back time is established by signals transmitted over said temporarily established communication connection to said called communication facility.

35. The method set forth in claim 27 wherein said call back time is generated within said called facility and communicated by said robotic establishing step over said temporarily established communication connection.

36. The method set forth in claim 35 wherein said robotic establishing step includes the step of:
converting back and forth between digital data and human understandable form.

37. The method set forth in claim 36 wherein said storing step includes a queue arranged to store call back identities in association with call back times.

38. The method set forth in claim 37 wherein said storing means further includes:
means for removing said call back identities at said associated call back time.

39. The method set forth in claim 37 wherein said call back identification step further includes the steps of:
obtaining over said temporarily established connection other information pertinent to said temporary connection; and
storing said other information in said queue in association with said call back time.

40. A method of answering incoming calls on a plurality of telephone lines, said method comprising the steps of:
robotically ascertaining the call back identity of incoming calls;
disconnecting said incoming call connection from said selected calling telephones after ascertaining said call back identify;
establishing a call back connection to said ascertained identities of said incoming calls at a later period of time
ascertaining the call back time for each said ascertained call identity; and
robotically communicating said ascertained call back time to each said ascertained call back identity prior to enabling said disconnecting step with respect to said selected calls.

41. The method set forth in claim 40 wherein said incoming calls are serviced by any one of a plurality of resources, and wherein said robotically ascertaining step is responsive to an unavailability of said resources to service said incoming calls.

42. The method set forth in claim 41 further including the steps of:
ascertaining the call back time for each said ascertained call back identity; and
robotically communicating said ascertained call back time to each said ascertained call back identity prior to enabling said disconnecting step with respect to said selected calls.

43. The method set forth in claim 40 wherein said call back ascertaining step includes the step of predictively determining the prospective availability of said resources.

44. The method set forth in claim 40 wherein said call back ascertaining step includes the step of:
exchanging information over said telephone line with respect to said identified calling line.

45. The method set forth in claim 40 wherein said call back time establishing step further includes the step of:
establishing said call back to said ascertained call back identity upon the statistical probability that a resource will be available when said call is completed to said ascertained call back identity.

46. A robot call management system for use with calls incoming to a called communication facility from a calling communication facility, said system comprising:
means for temporarily establishing a communication connection to any said calling communication line;
means for determining at any time the current availability and the subsequent availability of the call completion resources at said called communication facility;
means responsive to a determined current unavailability of said call completion resources for robotically establishing a call back time with respect to said calling communication facility, said call back time predicted from said determined subsequent availability of said call completion resources; and
means for communicating said call back time over said temporarily established connection.

47. The system set forth in claim 46 further comprising:
means for robotically ascertaining the call back identity of said calling connection;
means for storing said established call back identity and said established call back time; and
means for disconnecting said temporary communication connection.

48. The system set forth in claim 47 wherein said call back identity ascertaining means includes:
means for accepting signals communicated to said called communication facility over said temporarily established communication connection.

49. The system set forth in claim 48 wherein said call back identity means includes:
means for accepting signals communicated to said called communication facility separate from said temporarily established communication connection.

50. The system set forth in claim 46 wherein said robotically establishing means includes:
    means for sending requests over said temporarily established communication connection; and
    means for accepting signals communicated to said called communication facility over said temporarily established communication connection in response to said requests.

51. The system set forth in claim 50 wherein said robotic request sending means includes:
    means for converting back and forth between digital data and human understandable form.

52. The system set forth in claim 46 wherein said call back time establishing means includes:
    means for interchanging data over said temporarily established communication connection to arrive at a mutually acceptable call back time.

53. A system for processing calls incoming to a called communication facility from calling communication facilities, said system comprising:
    means for temporarily establishing a communication connection to any said calling communication facility;
    means for robotically establishing a digitally encoded call back identity of said calling communication facility;
    means for communication said established digitally encoded call back identity to another communication facility;
    means for robotically establishing a digitally encoded call back time with respect to said identified calling communication line; and
    means for communication said established digitally encoded call back time to said other communication facility in conjunction with said established call back identity.

54. The system set forth in claim 51 further comprising:
    means for communicating said established digitally encoded call back time over said established communication connection prior to disconnecting said communication connection.

55. The system set forth in claim 54 wherein said call back identity means includes:
    means for accepting signals communicated to said called communication facility over said temporarily established communication connection.

56. A method of processing calls incoming to a called communication facility from calling communication facilities, said method comprising the steps of:
    temporarily establishing a digitally encoded call back identity of said calling communication facility;
    storing said established digitally encoded call back identity;
    communicating said stored call back identity to another communication facility;
    robotically establishing a digitally encoded call back time with respect to said identified calling communication facility;
    storing said digitally encoded callback time in conjunction with said call back identity; and
    communication said stored digitally encoded call back time to said other communication facility in conjunction with said call back identity.

57. The method set forth in claim 56 further comprising the step of:
    communicating said established call back time over said established communication_connection prior to disconnecting said communication connection.

58. The method set forth in claim 57 wherein said call back identity step includes the step of:
    accepting signals communicated to said called communication facility over said temporarily established communication connection.

59. A system for answering incoming calls on a plurality of telephone lines, said system comprising:
    means for robotically ascertaining the call back identity of incoming calls;
    means for disconnecting said incoming calls after said call back identity has been ascertained; and
    means for establishing a call back connection to said ascertained identities of said incoming calls at a later period of time;
    means for ascertaining the call back time for each said ascertained call back identity;
    means for robotically communicating said ascertained call back time of each said incoming call prior to enabling said disconnecting means with respect to said incoming calls; and
    wherein said call back time ascertaining means includes means for predictive determining the prospective availability of said resources.

60. A system for answering incoming calls on a plurality of telephone lines, said system comprising:
    means for robotically ascertaining the call back identity of incoming calls;
    means for disconnecting said incoming calls after said call back identity has been ascertained; and
    means for establishing a call back connection to said ascertained identities of said incoming calls at a later period of time;
    means for ascertaining the call back time for each said ascertained call back identity;
    means for robotically communicating said ascertained call back time to each said incoming call prior to enabling said disconnecting means with respect to said incoming calls; and further including:
    a queue of ascertaining call back identities, and means for removing said call back identities from said queue at said ascertained call back time.

61. A system for answering incoming calls on a plurality of telephone lines, said system comprising:
    means for robotically ascertaining the call back identity of incoming calls;
    means for disconnecting said incoming calls after said call back identity has been ascertained;
    means for establishing a call back connection to said ascertained identities of said incoming calls at a later period of time;
    means for ascertaining the call back time for each said ascertained call back identity;
    means for robotically communicating said ascertained call back time to each said incoming call prior to enabling said disconnecting means with respect to said incoming calls; and wherein said call back time ascertaining means further includes:
    means for determining the statistical probability that a resource will be available when said call is completed to said ascertained call back identity.

62. A system for answering incoming calls on a plurality of telephone lines, said system comprising
    means for robotically ascertaining the call back identity of incoming calls;

means for disconnecting said incoming calls after said call back identity has been ascertained;

means for establishing a call back connection to said ascertained identities of said incoming calls at a later period of time; and wherein said call back identity ascertaining means further includes:

means for receiving ANI information from said incoming calls.

63. A robot controller responsive to incoming calls from a plurality of calling telephone facilities comprising:

a central processing unit for controlling said robot controller;

means controlled by said processing unit for ascertaining a call back time for selected calling telephone facilities;

means for establishing a call back connection to certain ones of said selected calling telephone facilities at a later period of time;

wherein said call back establishing means includes:

a call back queue for storing call back information for said certain ones of said calling telephone facilities; and means for removing from said queue stored call back information at said later period of time.

64. A robot controller responsive to incoming calls from a plurality of calling telephone facilities comprising:

a central processing unit for controlling said robot controller;

means controlled by said processing unit for ascertaining a call back time for selected calling telephone facilities;

means for interrogating said selected calling telephone facilities; and means for monitoring signals returned from said calling telephone facilities in response to said interrogation.

65. A robot controller responsive to incoming calls from a plurality of calling telephone facilities comprising:

a central processing unit for controlling said robot controller;

means controlled by said processing unit for ascertaining a call back time for selected calling telephone facilities;

means for establishing a call back connection to certain ones of said selected calling telephone facilities at a later period of time;

wherein said incoming calls require service of call servicing resources;

wherein said call back time is ascertained when said call servicing communication resources are unavailable to handle said telephone facility; and wherein said call back time ascertaining means includes:

means for interrogating said selected calling telephone facility to establish a call back time;

means for predictively determining the availability of one of said call servicing communicating resources; and means controlled jointly by said interrogating means and by said predictively determining means for controlling said time ascertaining means.

66. A robot controller responsive to incoming calls from a plurality of calling telephone facilities comprising:

a central processing unit for controlling said robot controller;

means controlled by said processing unit for ascertaining a call back time for selected called telephone facilities;

means for establishing a call back connection to certain ones of said selected calling telephone facilities at a later period of time;

wherein said means for establishing a call back connection further comprises:

means for establishing said call back to said selected calling telephone facility upon the statistical probability that a resource will be available to handle said established call when said call is completed to said original calling facility.

* * * * *

UNITED STATES PATENT AND TRADEMARK OFFICE
CERTIFICATE OF CORRECTION

PATENT NO. : 5,155,761

DATED : October 13, 1992

INVENTOR(S) : Daniel D. Hammond

It is certified that error appears in the above-identified patent and that said Letters Patent is hereby corrected as shown below:

Col. 8, line 4, delete the word "identify" and insert therefor the word --identity--.

Col. 8, line 11, delete the word "robitcally" and insert therefor the word --robotically--.

Col. 8, line 24, delete the word "can" and insert therefor the word --said--.

Col. 8, line 36, delete the word "wall" and insert therefor the word --will--.

Col. 10, after line 51, insert the following language:

--robotically establishing the call back indentity of said calling communication facility;--

Col. 10, line 54, delete the word "string" and insert therefor the word --storing--.

Col. 10, line 64, delete the word "communication" and insert therefor the word --communicating--.

Col. 11, line 63, delete the word "identify" and insert therefor the word --identity--.

Col. 11, line 68, insert after the word "call" the word --back--.

Col. 13, line 28, delete the word "communication" and insert therefor the word --communicating--.

UNITED STATES PATENT AND TRADEMARK OFFICE
CERTIFICATE OF CORRECTION

PATENT NO. : 5,155,761
DATED : October 13, 1992
INVENTOR(S) : Daniel D. Hammond

It is certified that error appears in the above-identified patent and that said Letters Patent is hereby corrected as shown below:

Col. 13, line 34, delete the word "communication" and insert therefor the word --communicating--.

Col. 13, after line 51:

delete the words "temporarily establishing a digitally encoded call back identity of said calling communication facility;"

insert therefor the following language:

--temporarily establishing a communication connection to any said calling communication facility;

robotically establishing a digitally encoded call back identity of said calling communication facility;--

Col. 13, line 62, the word "callback" should be written as --call back--.

Col. 13, line 64, delete the word "communication" and insert therefor the word --communicating--.

Col. 14, line 25, delete the word "predictive" and insert therefor the word --predictively--.

Col. 14, line 43, delete the word "ascertaining" and insert therefor the word --ascertained--.

UNITED STATES PATENT AND TRADEMARK OFFICE
CERTIFICATE OF CORRECTION

PATENT NO. : 5,155,761

DATED : October 13, 1992

INVENTOR(S) : Daniel D. Hammond

It is certified that error appears in the above-identified patent and that said Letters Patent is hereby corrected as shown below:

Col. 15, after line 34, add the following language:

--means for establishing a call back connection to certain ones of said selected calling telephone facilities at a later period of time;

wherein said call back time ascertaining means includes:--

Col. 16, line 19, delete the word "communicating" and insert therefor the word --communication--.

Col. 16, line 30, delete the word "called" and insert therefor the word --calling--.

Signed and Sealed this

Twenty-fifth Day of January, 1994

Attest:

BRUCE LEHMAN

Attesting Officer

Commissioner of Patents and Trademarks